US009803126B1

(12) United States Patent
Becker

(10) Patent No.: US 9,803,126 B1
(45) Date of Patent: Oct. 31, 2017

(54) METHOD OF LOW-TEMPERATURE LIQUID CONTAINMENT AND TRANSPORT

(71) Applicant: H-O-H Water Technology, Inc., Palatine, IL (US)

(72) Inventor: Henry A. Becker, Barrington, IL (US)

(73) Assignee: H-O-H WATER TECHNOLOGY, INC., Palatine, IL (US)

( * ) Notice: Subject to any disclaimer, the term of this patent is extended or adjusted under 35 U.S.C. 154(b) by 0 days.

(21) Appl. No.: 15/244,288

(22) Filed: Aug. 23, 2016

(51) Int. Cl.
*C09K 5/00* (2006.01)
*C09K 5/20* (2006.01)
*C01B 5/00* (2006.01)

(52) U.S. Cl.
CPC . *C09K 5/20* (2013.01); *C01B 5/00* (2013.01)

(58) Field of Classification Search
None
See application file for complete search history.

(56) References Cited

U.S. PATENT DOCUMENTS

| 4,187,904 A | 2/1980 | Kuhnlein |
| 4,454,724 A | 6/1984 | Erickson |
| 4,559,993 A | 12/1985 | Picard et al. |
| 4,563,295 A | 1/1986 | Erickson |
| 5,465,585 A | 11/1995 | Mornhed et al. |
| 5,655,377 A | 8/1997 | Mornhed et al. |
| 7,922,931 B1 * | 4/2011 | Cordaro ............ C01D 9/00 252/67 |
| 2004/0164270 A1 * | 8/2004 | Novak ............ C09K 3/185 252/70 |

* cited by examiner

*Primary Examiner* — Necholus Ogden, Jr.
(74) *Attorney, Agent, or Firm* — Husch Blackwell LLP

(57) ABSTRACT

The freezing point of a liquid in a chilled liquid containment system is decreased by the addition of a mixture of sodium nitrite and sodium nitrate. Solutions of nitrite/nitrate in a ratio of 1.0:1 to 3.0:1 at a concentration of at least 25% lowers the freezing point of water to as low as −33° C. or lower, permitting water to remain liquid well below its ambient freezing point and preventing pipes containing the nitrite/nitrate solution from bursting when exposed to sub-zero temperatures. This allows liquids to remain liquid at much lower temperatures than normal, allowing the circulation of the liquids at lower temperatures and protecting their containment systems from the damage that could occur when the liquids freeze into their solid state while within the containment systems.

19 Claims, 1 Drawing Sheet

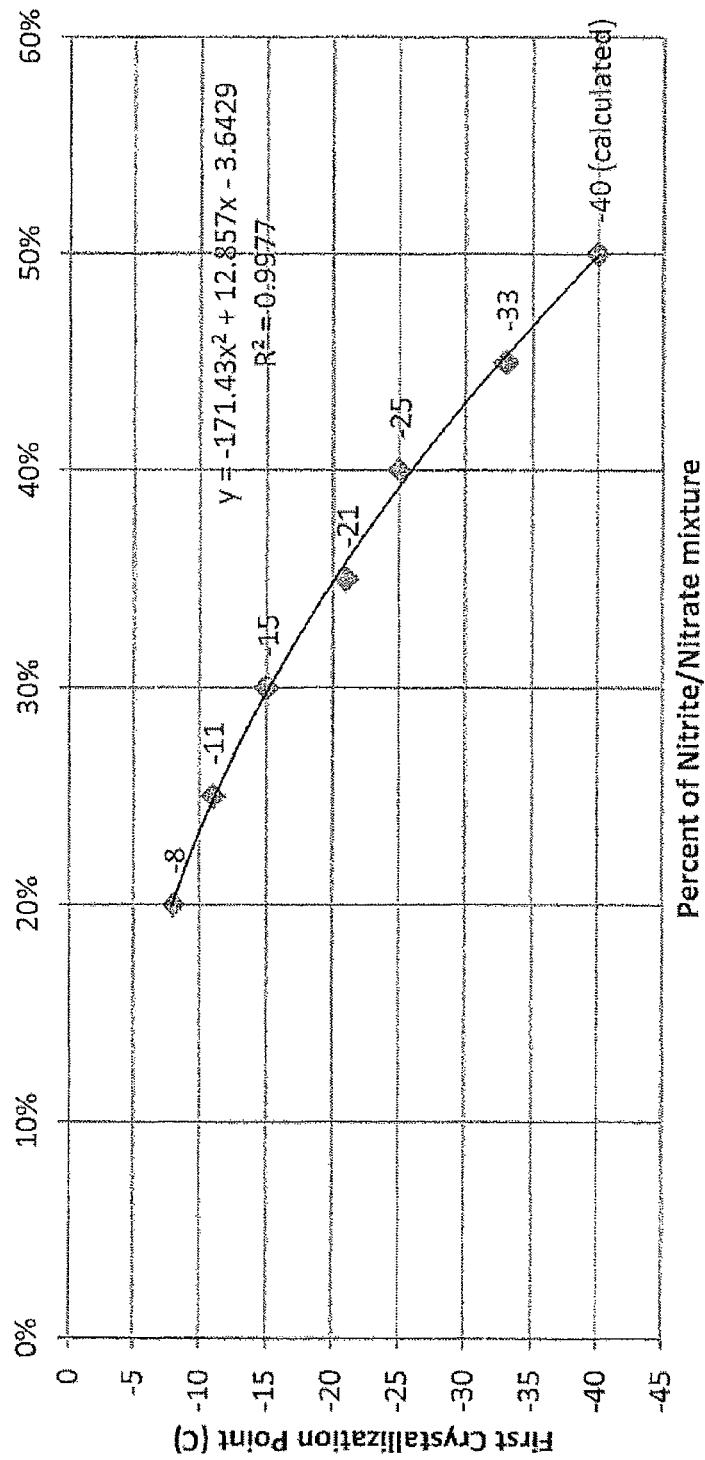

METHOD OF LOW-TEMPERATURE LIQUID CONTAINMENT AND TRANSPORT

BACKGROUND OF THE INVENTION

Many closed fluid containment and transport systems require protection against damage caused when freezing temperatures cause their fluid contents to freeze, thereby cracking or rupturing their containment systems, particularly where coils, pipes, and other equipment are exposed to temperatures that drop below freezing.

One example is outdoor or underground water pipes in Northern climes during the winter. This need is even greater where below-freezing temperatures are sustained for long periods of time. Another example relates to the practice of "winterization" of commercial building air-handler coils inactivated during the winter months. Coil winterization involves replacement of residual water from coil low spots with an antifreeze solution to prevent bursting upon coil exposure to incoming, unheated building supply air. Similarly, other liquid containment and transport systems and liquid storage systems can benefit from features that prevent their contents from freezing, and thus avoid temperature-related damage to or compromise of their containment systems. Even where the integrity of the containment system is not of concern, frozen solids such as ice crystals may impair the flow of the unfrozen portion of the liquid. When freezing is sufficient to block liquid flow, the frozen solids usually must be unfrozen before resuming fluid flow through transport systems. There are also other situations where it is desirable to keep a liquid, such as water, in a liquid state at a temperature below its normal freezing point.

It can be especially desirable to provide protection to equipment and vessels that transport or store chilled liquids. As chilled liquids generally reach their freezing points and transition from liquid to solid form faster than the same liquids maintained at ambient temperatures, additional anti-freezing protections to these systems may prevent these liquids from freezing when exposed to relatively modest decreases in temperature.

There are a number of insulating systems that provide some protection against the effects of extremely cold temperatures in fluid containment and transport systems. Anti-freeze solutions for these types of systems are typically made from ethylene or propylene glycols. However, glycols can degrade into glycolic acid, which is known to lower pH and to accelerate corrosion. Ethylene glycol is subject to both microbial and chemical degradation. Other systems allow the short-term use of glycol-based anti-freeze solutions, but require the glycol to be thoroughly flushed from the system before resuming normal operation. In many instances, relatively small amounts of glycol used to protect very small volume system components is not flushed, or not adequately flushed, resulting in the development of acidic and/or highly unfavorable biological conditions throughout an entire equipment system or an entire building system. Mitigating glycol decomposition related problems can lead to significant expense in flush water, man-hours and corrective chemical addition. Glycol-based anti-freeze solutions can be costly to prepare and maintain, and may not be compatible with some cooling systems. Furthermore, ethylene glycol is known to be toxic to human beings.

There is a need for alternatives to the formulations that are currently used to preserve the integrity of systems that transport, store, or contain liquid when exposed to below-freezing temperatures and a particular need for formulations that avoid the corrosive effects known in current glycol-based formulations. There is a need for an inexpensive chemical anti-freeze formulation that will minimize liquid waste, maximize energy savings, protect equipment and machinery, and minimize health and safety risks, particularly for anti-freeze formulations that can be applied to mechanical systems that transport or store liquids.

Nitrite ($NO2$) and nitrate ($NO3$) solutions have been used to cool large volumes of water in thermal energy storage systems. However, this application has been limited to cooling volumes of water, not to preserving the equipment containing or transporting the water.

Further economic savings and other advantages could be achieved with improved nitrite/nitrate formulations used to improve the integrity of liquid containment and transport systems.

BRIEF SUMMARY OF THE INVENTION

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

The present invention relates to an object, a method, or a manufacturing method. In addition, the present invention relates to a process, a machine, manufacture, or a composition of matter. In particular, at least one embodiment of the present invention provides a method of containing chilled liquids, such as water, while eliminating the disadvantages of glycol-based anti-freeze solutions.

In accordance with an aspect of the present invention, a method a providing low-temperature water storage or transport involves preparing aqueous solutions of sodium nitrite and sodium nitrate, adding those solutions to water and using the nitrite/nitrate formulation to decrease the freezing point of the water, thus keeping the water in its liquid form or a semi-liquid ice crystal slurry when it attains temperatures well below its normal freezing point (0° Celsius or −32° Fahrenheit). In some embodiments, the treated water formulation may be prevented from forming ice crystals, or solid ice, at temperatures as low as −27.4° C., −40° C., or even lower. It is envisioned that formulations of nitrite and nitrate can confer similarly decreased freezing points to other liquids for similar applications.

A range of nitrite/nitrate ratios can be used to practice the present invention, as can a range of nitrite/nitrate concentrations. Preferred ranges for the nitrite/nitrate ratios include 1.0:1 to 3.0:1 ratios of nitrite/nitrate. Even more preferred ranges include 2.0:1 to 3.0:1 and 2.2:1 to 3.0:1 ratios of nitrite/nitrate. Preferred concentrations for the nitrite/nitrate solutions include 20-50% and 20-45% concentrations of nitrite/nitrate in the solutions. Even more preferred concentrations include 35-50% and 35-45% concentrations of nitrite/nitrate in the solutions.

In at least one embodiment, nitrite/nitrate formulations were introduced into pipes to protect the pipes from bursting when exposed to sub-zero temperatures. It is envisioned that similar nitrite/nitrate solutions can prevent temperature-induced damage to other kinds of equipment containing the solutions.

BRIEF DESCRIPTION OF THE DRAWINGS

FIG. 1 shows a graph of the first crystallization points of formulations of a 2.5:1 nitrite/nitrate solution prepared at different concentrations.

DETAILED DESCRIPTION OF PREFERRED EMBODIMENTS OF THE INVENTION

Those skilled in the art will readily appreciate that the modes and details of the present invention can be changed in various ways without departing from the spirit and scope of the present invention. Thus, the present invention should not be construed as being limited to the description of the embodiments below. While this invention is susceptible of embodiments in many different forms, there are shown in the drawings and will be described in detail herein specific embodiments with the understanding that the present disclosure is to be considered as an exemplification of the principles of the invention. It is not intended to limit the invention to the specific illustrated embodiments.

The features of the invention disclosed herein in the description, drawings, and claims can be significant, both individually and in any desired combinations, for the operation of the invention in its various embodiments. Features from one embodiment can be used in other embodiments of the invention.

It should be further understood that the title of this section of this specification, namely, "Detailed Description Of The Invention," relates to a requirement of the United States Patent & Trademark Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Formulations of sodium nitrite and sodium nitrate were prepared with deionized water. The nitrite/nitrate formulations were subjected to subzero temperatures. The freezing points of the formulations were measured using metrics commonly used to test anti-freeze formulations: the first crystallization point, the slurry temperature, and/or the hard to mix temperature.

The "first crystallization point" is the temperature at which ice crystals begin to form in the solution. The "slurry temperature" is the temperature at which crystallized has progressed to a suspension of ice crystals in solution. The "hard to mix temperature" is the temperature at which the solution begins to solidify into the consistency of a thick paste, but can still be mixed. The first crystallization point was measured for all formulations, while the slurry temperatures and hard to mix temperatures were determined for only some formulations.

Example 1

The optimum ratio of nitrite/nitrate (NO2/NO3) for achieving the greatest decrease in the freezing point of water was determined. Solutions were made to contain 40% nitrite/nitrate in deionized water, but with different ratios of nitrite/nitrate. The nitrite/nitrate solutions were made of sodium nitrite and sodium nitrate mixed in 1:1, 1.5:1, 2:1, 2.5:1, or 3:1 ratios. The nitrite/nitrate solutions were subjected to subzero temperatures and the freezing points of the nitrite/nitrate-treated water solutions were measured.

A 1-liter beaker was used as an outer containment vessel. Stoppers were placed at the bottom and 53% ethylene glycol was added to the beaker. Dry ice was added, which cooled to the 53% ethylene glycol to −40° C. as the dry ice sublimated. A 150-ml beaker was placed within the 1-liter beaker to rest on the stoppers. The 150-ml beaker contained a stir bar and a mercury thermometer capable of measuring temperatures as low as −90° C. The nitrite/nitrate solutions were added to 150-ml beaker, with stirring, and the temperatures at which the first crystallization point, the slurry temperature, and/or the hard to mix temperature were observed and recorded in Table 1.

TABLE 1

The first crystallization points of 40% nitrite/nitrate solutions at different ratios of nitrite to nitrate.

| Ratio of $NO_2/NO_3$ | First Crystallization Point (° C.) |
|---|---|
| 1.0 to 1 | −13° C. |
| 1.5 to 1 | −15° C. |
| 2.0 to 1 | −17° C. |
| 2.5 to 1 | −18° C. |
| 3.0 to 1 | −15° C. |

Water is known to have a freezing point of 0° C. or 32° F. All of the ratios, between ratios of 1.0:1 to 3.0:1, decreased the freezing point of water containing the nitrite/nitrate solutions. However, the 2.5:1 nitrite/nitrate solutions exhibited the lowest first crystallization point at −18° C. (or −0.4° F.). Therefore, the 2.5:1 nitrite/nitrate solution was used in subsequent examples.

However, it was noted that the mixture of polyethylene glycol and dry ice resulted in an uneven development of ice crystals on the walls and floor of the 150-ml beaker containing the nitrite/nitrate solutions. This cooling system cooled the 150-ml beakers much faster than the solutions they contained, suggesting that the ice crystals formed at a location having a lower temperature than that of the solution containing the thermometer. That is, the ice crystals may have formed on the much colder beaker walls, while the thermometer measured the temperature of the relatively warmer solution at the center of the beaker.

Therefore, it is believed that this system was adequate to determine which ratios of nitrite/nitrate achieved the lowest first crystallization points, but that the first crystallization points in of the nitrite/nitrate solutions are actually lower than those reported in Table 1.

Example 2

To determine the optimum concentration of 2.5:1 nitrite/nitrate solution to achieve the greatest decrease in the freezing point of water, nitrite/nitrate solutions were prepared at concentrations of 20-50% of the 2.5:1 nitrite/nitrate formulation in deionized water. Specifically, the first crystallization points of concentrations of 20%, 25%, 30%, 35%, 40%, 45% and 50% nitrite/nitrate formulations were measured (FIG. 1).

To overcome the potential problems noted in the previous example, and to ensure accurate measurement of the freezing points of the nitrite/nitrate solutions, an apparatus was constructed to cool the 100-ml nitrite/nitrate solutions at the same rate as the 150-ml beakers containing them when reaching their first crystallization point, slurry temperature, and/or hard to mix temperature. A 1-liter beaker was used as an outer containment vessel. Two stoppers were placed at the bottom of the 1-liter beaker and 53% ethylene glycol was added to the beaker. Dry ice was added, which cooled to the 53% ethylene glycol to −40° C. as the dry ice sublimated. A 400-ml beaker was placed into the 1-liter beaker to rest on the stoppers in the 1-liter beaker. Three stoppers were placed in the 400-ml beaker and 53% ethylene glycol was added to the 400-ml beaker. The final 150-ml beaker was placed within the 400-ml beaker to rest on the stoppers in the 400-ml beaker. The 150-ml beaker contained a stir bar and a mercury thermometer rated down to −90° C. The nitrite/nitrate solutions were added to 150-ml beaker, with stirring, and the temperatures at which the first crystallization point, the slurry temperature, and/or the hard to mix temperature were observed and recorded.

The nested beaker system allowed a uniform cooling of the nitrite/nitrate solutions. It prevented the 150-ml beaker from freezing faster than the solution it held and allowed ice crystals to begin forming in the nitrite/nitrate solutions, rather than begin forming on the walls of the 150-ml beaker, to determine the temperatures of the freezing points for the nitrite/nitrate solutions. In this system, radically lower freezing points were observed then in Example 1 and were reported in Table 2.

TABLE 2

The first crystallization points of 40% nitrite/nitrate solutions at different ratios of n: nitrite to nitrate.

| NO2/NO3 (%) | Specific Gravity | Refractive Index | First Crystallization Point Temperature |
| --- | --- | --- | --- |
| 20% | 1.130 | 1.3542 | −8° C. |
| 25% | 1.179 | 1.3618 | −11° C. |
| 30% | 1.220 | 1.3666 | −15° C. |
| 35% | 1.262 | 1.3734 | −21° C. |
| 40% | 1.303 | 1.3798 | −25° C. |
| 45% | 1.351 | 1.3852 | −33° C. |
| 50% | 1.401 | 1.3734 | −40° C. (calculated) |

Decreased first crystallization points were observed with 20-45% nitrite/nitrate solutions, ranging between −8° C. to −33° C. First crystallization points below −20° C. were achieved with 35-45% nitrite/nitrate solutions.

The lowest first crystallization temperature that was measured was for the 45% nitrite/nitrate solution, which had a first crystallization temperature of −33° C. Upon reaching this temperature, the solution bypassed the slurry point stage of freezing and immediately attained the consistency associated with the hard to mix point. The 45% nitrite/nitrate solution did not achieve a fully solid state at −33° C. For this reason, the first crystallization temperature of the 50% nitrite/nitrate solution was calculated, rather than measured. Based on the measurements obtained from the other concentrations, the first crystallization temperature of the 50% nitrite/nitrate solution was calculated as −40° C.

For the 2.5:1 nitrite/nitrate solution, the freezing point of the solution decreased significantly as the concentration of the nitrite/nitrate solution increased. The experimental results show that the 45% nitrite/nitrate solution can withstand freezing at temperatures as low as −33° C., preventing the formation of a solid that may result in burst pipes. These results also suggest that higher concentrations of nitrite/nitrate may be able to withstand freezing at temperatures as low as −40° C. or even lower than the temperatures observed with the described cooling system.

Example 3

The ability of the nitrite/nitrate solutions to protect water pipes from bursting after exposure to subzero temperatures was tested. Copper pipes were filled with either deionized water alone or deionized water containing 40% of nitrite/nitrate at a 2.5:1 ratio. The pipes were pre-cooled overnight to approximately −16° C.

A metal tank was wrapped in insulation and filled with 53% ethylene glycol. Dry ice was added to create a −40° C. ice bath, as measured by a thermometer. The pipes were suspended in the −40° C. ice bath for 15 minutes. The pipe filled with deionized water burst, developing a rupture about ⅛th of an inch long. The pipe filled with 40% concentration of 2.5:1 nitrite/nitrate solution remained intact, with no visible damage observed.

It is envisioned that specific embodiments of the present invention include a method of low-temperature water storage, having the steps of preparing a sodium nitrite and sodium nitrate solution, and placing the prepared solution (of sodium nitrite, sodium nitrate, and water) in a water containment system and the first crystallization point of the treated water is below −0° C. In preferred embodiments, the first crystallization point of the water is below −5° C., −10° C., or −15° C.; in preferred embodiments, the first crystallization point of the water is below −20° C., −25° C., −30° C., −35° C., or −40° C.

It is also envisioned that specific embodiments of the present invention include a method of low-temperature water storage including sodium nitrite and sodium nitrate prepared at a ratio between about 1.0:1 to about 3.0:1. In preferred embodiments, the sodium nitrite and sodium nitrate are prepared at a ratio between about 2.1:1 to about 3.0:1; in more preferred embodiments, the sodium nitrite and sodium nitrate are prepared at a ratio between about 2.5:1.

It is also envisioned that specific embodiments of the present invention include a method of low-temperature water storage including preparing aqueous solutions of sodium nitrite and sodium nitrate at concentrations of about 20-50%. In preferred embodiments, the nitrite:nitrate solutions are prepared at concentrations about 30-50%; in more preferred embodiments, the nitrite/nitrate solutions are prepared at concentrations about 35-45%. Some embodiments may include at least 20%, 30%, 40%, or 50% or more concentrations of nitrite/nitrate solutions, as long as an aqueous solution is obtained.

It is also envisioned that embodiments of the present invention include a method of low-temperature water storage implemented in pipes, chilling equipment, storage tanks, and other systems for storing, transporting, and processing water and other liquids.

In some embodiments, the present invention may be applied to liquids other than water, providing embodiments for a method of low-temperature liquid containment, having the steps of preparing a liquid containing a sodium nitrite and sodium nitrate solution, and placing the prepared liquid in a liquid containment system, so that the first crystallization point of the prepared liquid is at least 10° C. lower than the liquid in the absence of the sodium nitrite and sodium nitrate solution. In some embodiments, the first crystallization point of the prepared liquid may be 10-50° C. lower than the liquid in the absence of the sodium nitrite and sodium nitrate solution or, more preferably, 20-40° C. lower than the liquid in the absence of the sodium nitrite and sodium nitrate solution.

Specific embodiments of a method of low-temperature water storage according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. It is understood to encompass the present invention and any and all modifications, variations, or equivalents that fall within the spirit and scope of the basic underlying principles disclosed and claimed herein.

What is claimed is:

1. A method of water storage in freezing temperatures, comprising:
   preparing a solution consisting of sodium nitrite and sodium nitrate; and
   placing the prepared solution in a water containment system,
   wherein a first crystallization point of the prepared solution is below −15° C., the first crystallization point being the temperature at which ice crystals form in the prepared solution.

2. The method according to claim 1, wherein the first crystallization point of the prepared solution is below −20° C.

3. The method according to claim 1, wherein the sodium nitrite and sodium nitrate are prepared at a ratio of about 1.0:1 to 3.0:1.

4. The method according to claim 1, wherein the sodium nitrite and sodium nitrate are prepared at a ratio of 2.1:1 to 3.0:1.

5. The method according to claim 1, wherein the sodium nitrite and sodium nitrate are prepared at a ratio of about 2.5:1.

6. The method according to claim 1, wherein a solution of at least 20% sodium nitrite and sodium nitrate is prepared.

7. The method according to claim 1, wherein a solution of at least 35% sodium nitrite and sodium nitrate is prepared.

8. The method according to claim 1, wherein a 20-50% solution of sodium nitrite and sodium nitrate is prepared.

9. The method according to claim 1, wherein a 30-50% solution of sodium nitrite and sodium nitrate is prepared.

10. The method according to claim 1, wherein a 35-45% solution of sodium nitrite and sodium nitrate is prepared.

11. The method according to claim 4, wherein a 30-50% solution of sodium nitrite and sodium nitrate is prepared.

12. The method according to claim 4, wherein a 35-45% solution of sodium nitrite and sodium nitrate is prepared.

13. A method of liquid containment at freezing temperatures, comprising:
    preparing a liquid consisting of sodium nitrite and sodium nitrate; and
    placing the prepared liquid in a closed liquid containment system,
    wherein a first crystallization point of the prepared liquid is at least 10° C. lower than the liquid prepared without the sodium nitrite and sodium nitrate solution, the first crystallization point being the temperature at which ice crystals form in the prepared solution.

14. The method according to claim 13, wherein the first crystallization point of the prepared liquid is about 10-50° C. lower than the liquid prepared without the sodium nitrite and sodium nitrate solution.

15. The method according to claim 13, wherein the first crystallization point of the prepared liquid is about 20-40° C. lower than the liquid prepared without the sodium nitrite and sodium nitrate solution.

16. The method according to claim 1, wherein the water containment system is selected from the following: a pipe, a water pipe, and a storage tank.

17. The method according to claim 1, wherein the water containment system comprises a pipe.

18. The method according to claim 13, wherein the water containment system is selected from the following: a pipe, a water pipe, and a storage tank.

19. The method according to claim 13, wherein the water containment system comprises a pipe.

* * * * *